US006391249B1

(12) United States Patent
Heckmann et al.

(10) Patent No.: US 6,391,249 B1
(45) Date of Patent: May 21, 2002

(54) DEVICE FOR PRODUCING SPONGE IRON

(75) Inventors: Hado Heckmann; Georg Schleich, both of Duesseldorf; Wolfgang Guenther, Neuss, all of (DE); Kurt Wieder, Schwertbert; Wilhelm Stastny, Alberndorf, both of (AT)

(73) Assignee: Deutsche Voest-Alpine Industrieanlagenbau GmbH (DE)

( * ) Notice: Subject to any disclaimer, the term of this patent is extended or adjusted under 35 U.S.C. 154(b) by 0 days.

(21) Appl. No.: 09/486,879

(22) PCT Filed: Aug. 26, 1998

(86) PCT No.: PCT/DE98/02581

§ 371 Date: Apr. 3, 2000

§ 102(e) Date: Apr. 3, 2000

(87) PCT Pub. No.: WO99/11825

PCT Pub. Date: Mar. 11, 1999

(30) Foreign Application Priority Data

Sep. 2, 1997 (DE) ........................................ 197 39 443

(51) Int. Cl.[7] .............................. C12B 7/16; C21C 1/04

(52) U.S. Cl. .......................... 266/183; 266/171; 75/381

(58) Field of Search ................................ 266/171, 172, 266/183; 75/381

(56) References Cited

U.S. PATENT DOCUMENTS 681,609 A * 8/1901 Bechi ......................... 266/183
4,605,205 A 8/1986 Langner et al.
6,224,647 B1 * 5/2001 Vuletic ........................ 75/381

FOREIGN PATENT DOCUMENTS

| | | | |
|---|---|---|---|
| AT | 387 037 | B | 11/1988 |
| DE | 23 12 538 | A | 9/1974 |
| DE | 34 22 185 | C | 12/1985 |
| EP | 0 166 679 | A | 1/1986 |

OTHER PUBLICATIONS

Database WPI, Section Ch, Week 8527, Derwent Publications Ltd., London, GB; Class J09,AN 85–163678, SU 1129–239–A; AS Kaza Chem.

Metal; Dec. 15, 1984; see Abstract.

* cited by examiner

*Primary Examiner*—Scott Kastler
(74) *Attorney, Agent, or Firm*—Marshall & Melhorn, LLC

(57) ABSTRACT

A device for producing sponge iron from iron oxide lumps consists of a reduction shaft in which a hot dust laden reducing gas is delivered. The gas is produced in a gas generator by means of partial oxidation of solid carbon carriers and passes into the lower end of the reduction zone via lateral reduction gas inlets. The iron oxide lumps are fed to the upper area of the reduction shaft and are radially fed as sponge iron to the lower end of said reduction shaft via delivery organs. The delivery organs are arranged in such a manner that the sponge iron is conveyed only radially outwardly.

4 Claims, 1 Drawing Sheet

DEVICE FOR PRODUCING SPONGE IRON

BACKGROUND OF THE INVENTION

The invention relates to a device for producing sponge iron from iron oxide lumps in a reduction shaft. The device uses a hot dust laden reduction gag which is produced in a gas generator through partial oxidation of solid carbon carriers. The reduction gas is guided via lateral reduction gas inlets at the lower end of the reduction zone into the reduction shaft, in which device the iron oxide lumps are placed in the upper region of the reduction shaft and are delivered radially at the lower end of the shaft as sponge iron by delivery organs.

1. Field of the Invention

In the reduction of iron oxide lumps in a reduction shaft, the sponge iron produced is delivered from the lower portion of the reduction shaft. A possible way described in EP0 085 290 A1 of effecting this delivery consists in the sponge iron being led away by means of radially acting delivery organs, especially screw conveyors, from the side of the reduction shaft furnace. Through the radial arrangement of the screw conveyors, there exists between same lateral intervening spaces (dead areas) which widen towards the inner wall of the reduction shaft. On these intervening space areas are built up unmoved zones of the charge moved downwards through the shaft, so called "dead men". Furthermore it is problematic, making the delivery organs any size in respect of their diameter and length for reasons of solidity, such that normally even in the center of the reduction shaft, between the inner ends of the delivery organs (screw heads) there exists a dead area, on which likewise a "dead man" (central "dead man") builds up. The height of these "dead men" depends on the size of the respective intervening space area and the fill angle of the charge poured. In particular, with high dust cover as a result of the dust content of the reduction gas, this fill angle is very steep and the inner friction is very high. The "dead men" formed over the intervening space areas of the screw conveyors and the central "dead man" can support one another. The "dead men" have a potentially harmful influence on the uniformity of the gasification of the charge and on the charge movement in the shaft and thus on the uniformity of the reduction of the iron oxides.

2. Description of the Related Art.

EP 0 166 679 A1 describes an arrangement of a melting gasifier and a direct reduction shaft furnace with a fill of iron oxide lumps in which the shaft furnace has a base to support the packed column, delivery openings in the base to deliver the sponge iron particles and at least one inlet for the reduction gas delivered from the gasifier into the lower section of the packed column. Since the reduction gas is very dust laden, there is a danger of the free spaces in the packed column being blocked up with the consequence of a corresponding increase in the resistance to the passage of the reduction gas. In order to make it possible for even a gas laden with a larger proportion of dust to be supplied from the gasifier directly into the reduction shaft furnace, without adding to the spaces in the packed column and consequently leading to uneven gas distribution in the shaft furnace and therefor to operation breakdowns, radially disposed screw conveyors are provided to move, mutually and constantly, the particles of the fill backwards and forwards in the region through which reduction gas flows, adjacent to the inlet for the reduction gas, and furthermore at least one delivery opening is arranged respectively at the opposite ends of the screw conveyors in the base. The drive of the screw conveyors can be realized in that either the individual screws are rotated in succession in both directions, or a combination of screws conveying constantly outwards and constantly inwards is provided.

In this arrangement, both the delivery opening are shielded vis-á-vis the packed column; the outer one by an annular apron and the inner one by a cone. The cone ends shortly above the screw conveyors or it contains entry apertures in which the inner ends of the radially disposed screws engage. By this means it is ensured that the sponge iron does not reach the delivery openings directly, i.e. without additional conveying organs, but can only be transported to the openings by means of the screw conveyors. This is necessary in order to produce the backwards and forwards motion of the sponge iron.

Since the poured charge is also supported on the cone shielding the central delivery opening, the appearance of "dead men" is also probable here.

OBJECT OF THE SUMMARY OF THE INVENTION

Proceeding from EP 0 166 769 A1, it is therefore the object of the present invention to create a device for producing sponge iron from iron oxide lumps in a reduction shaft using a hot dust laden reduction gas, which is produced in a gas generator by partial oxidation of solid carbon carriers and is led via lateral reduction gas inlets into the reduction shaft at the lower end of the reduction zone, in which device the iron oxide lumps are placed in the upper region of the reduction shaft and are delivered radially at the lower end of the shaft by delivery organs, and in which device additional delivery opening for thesponge iron is provided in the base of the reduction shaft in the central region of the reduction shaft below the area formed between the inner ends of the delivery organs, in which device the building up of a "dead man" is avoided at least over the area situated in the center between the radial delivery organs.

This object is achieved according to the invention by providing an additional delivery opening for the sponge iron in the base of the reduction shaft in the central region of the reduction shaft below the area formed between the inner ends of the delivery organs, wherein the delivery organs are provided to convey the sponge iron only radially outwards. Additional advantageous developments are described herein.

Because the delivery organs are provided to convey the sponge iron only radially outwards, no backwards and forwards motion of the sponge iron takes place on the base of the reduction shaft and the central delivery opening does not have to be shielded, such that "no dead men" can be formed any more in the center nor substantially also laterally between the delivery organs, since the central area itself serves as a delivery opening and also the charge material situated above the lateral surfaces can no longer be supported on the central "dead man", but rather is guided as it sinks in the reduction shaft to a considerable extent to the additional delivery opening.

Advantageously, a guiding device is provided between each two delivery organs and extends upwards beyond same, in such a way that the sponge iron sinking downwards is guided laterally to the delivery organs and radially to the additional delivery opening. By this means increased guiding of the charge material to the delivery organs and the additional delivery opening is achieved.

The guiding devices preferably have an upper edge running obliquely upwards from the edge of the additional delivery opening to the inner wall of the reduction shaft, and widen downwards and radially outwards to the width of the lateral space between the delivery organs. By this means it is ensured that the whole charge material sinks uniformly downwards until it is delivered.

Through the division of the discharge into an external and central region, the sinking speed in the region of the shaft outer diameter and in the region above the central delivery can be controlled independently of one another. Thus—in conjunction with the individually adjustable delivery speeds of the delivery organs—purposeful control of the shaft action is possible over the whole shaft cross-section.

Advantageously there is located below the additional delivery opening a vertical shaft with a diameter which is constant and corresponds to the diameter of the delivery opening, the shaft being closed at the lower end, and at least one further delivery organ for the sponge iron, acting radially, being disposed above the base of the shaft.

BRIEF DESCRIPTION OF THE DRAWINGS

The invention is explained in greater detail below with the aid of the embodiments represented in the figures. These show.

DESCRIPTION OF THE PREFERRED EMBODIMENTS

Figure 3:
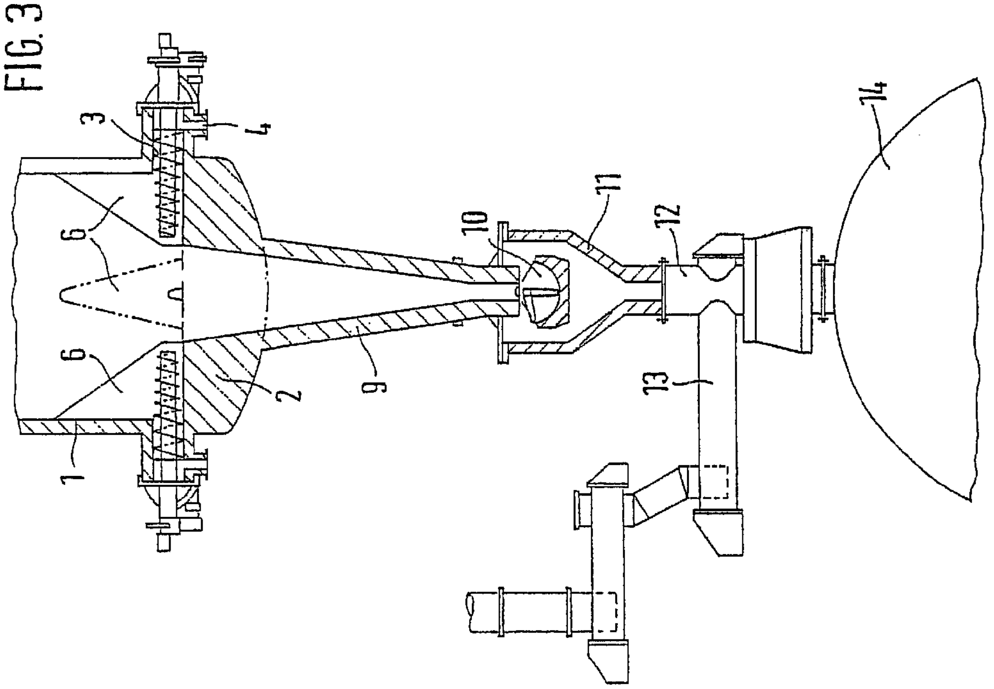
Figure 1:
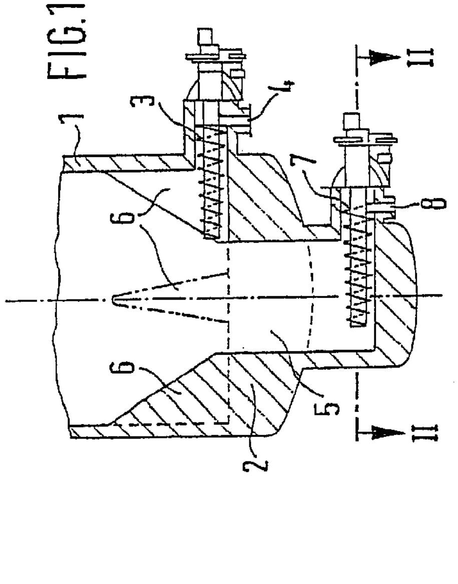
FIG. 1 the lower portion of a reduction shaft in a perpendicular sectional view according to a first embodiment, FIG. 2 a horizontal section through the reduction shaft furnace in the plane II—II in FIG. 1, and FIG. 3 the lower portion of a reduction shaft in a vertical sectional view according to a second embodiment.
Figure 2:
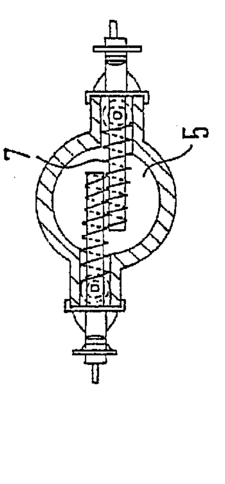

The figures show the portion of the reduction shaft below the bustle plane, i.e. the plane in which the reduction gas is blown into the shaft in order to rise upwards in same through the charge and to cause the transformation of the iron oxides into sponge iron.

The reduction shaft has a cylindrical or intermittently conical casing 1 which merges at the lower end into the base 2. Directly above the base 2 is located a plurality of, for example 10, lateral delivery openings for the charge containing the sponge iron, which are distributed evenly spaced in the peripheral direction along the casing 1 in a horizontal plane. Through each of these delivery openings is guided a delivery organ in the form of a screw conveyor 3. The screw conveyors 3 transport the charge which has sunk onto the base 2 radially outwards, such that said charge respectively reaches a fall-pipe 4 through which it is guided, for example into a melting gasifier producing the reduction gas. This charge delivery makes possible the sinking of the charge in the reduction shaft.

The radial screw conveyors 3 extend only over a portion of the radius of the reduction shaft, such that the spiral heads are at a spacing from the shaft axis and form a circular area between them. The base 2 contains a central delivery opening corresponding to this circular area and which merges into a cylindrical shaft 5 with a correspondingly reduced diameter in relation to that of the reduction shaft.

Above the base 2 is located, between respectively two screw conveyors 3, a wedge-shaped guiding element 6. The front or upper edge of the guiding elements extends from the edge of the central delivery opening upwards rising up to the inner wall of the casing 1, the angle of inclination of this edge in relation to the vertical being roughly 25 to 40°. Furthermore, the guiding elements 6, starting from this edge, widen downwards and radially outwards, such that their area lying on the base corresponds respectively to the dead area between two screw conveyors 3. The angle of inclination of the lateral surfaces of the guiding elements 6 lies in the region of 5 to 15°.

The guiding elements 6 guide the sinking charge in such a way towards the central delivery opening in the base 2 and to the screw conveyors 3 that practically the whole charge is delivered unhindered, i.e. the appearance of "dead men" is prevented.

The portion of the charge passing the central delivery opening reaches the shaft 5 which is closed below. In order to deliver the material from the latter, directly above the base of the shaft 5 are provided two delivery at openings lying diametrically opposite one another and through each of which a screw conveyor 7 is guided to provide delivery to a fall-pipe 8 which also leads into the melting gasifier, for example. Since the diameter of the shaft 5 is significantly smaller than that of the reduction shaft, the screw conveyors 7 protrude respectively beyond the center of the shaft 5, such that all the charge is entering the shaft 5 is transported without any blockage to the fall-pipes 8.

Instead of the screw conveyors 8, other delivery organs can also be provided on the base of the shaft 5, for example a cellular wheel sluice or a bunker reclaiming wheel.

In the reduction shaft according to FIG. 3, there is, communicating with the central delivery opening in the base 2, a shaft 9, the inner diameter of which decreases constantly downwards and is roughly 1 m or less at the lower end. The lower end of the shaft 9 is open, such that the charge can emerge from same. It falls onto a walking beam 10 which is located in a chamber 11 with an outlet pipe 12. Depending on the amount of the charge which has emerged from the shaft 9, the walking beam 10 carries out swivel movements and causes discontinuous delivery of the charge to the outlet pipe 12.

The outlet pipe 12 is led centrally through a coal inliner 13 into the head of a melting gasifier 14. The coal inliner 13 incorporates a vertical feed pipe from a coal bunker and a two-stage screw conveyor. Through the concentric introduction of charge material or sponge iron and coal into the head of the melting gasifier 14, the mixing together of same is promoted, such that the melting of the sponge iron and the production of the reduction gas in the melting gasifier 14 are improved.

What is claimed is:

1. A device for producing sponge iron from iron oxide lumps in a reduction shaft, using a hot dust laden reduction gas which is produced in a gas generator through partial oxidation of solid carbon carriers and is guided via lateral reduction gas inlets at the lower end of the reduction zone into the reduction shaft, in which device the iron oxide lumps are placed in the upper region of the reduction shaft and are delivered radially at the lower end of the shaft as sponge iron by delivery organs, and an additional delivery opening for the sponge iron is provided in the base of the reduction shaft in the central region of the reduction shaft below the area formed between the inner ends of the delivery organs wherein the delivery organs are provided to convey the sponge iron only radially outwards and wherein below the additional delivery opening, there is located a shaft with a diameter which tapers downwards, remains the same or widens, wherein the shaft is closed at the lower end, and wherein at least one further delivery organ for the sponge iron, acting radially, is disposed above the base of the shaft.

2. Device according to claim 1, wherein the additional delivery organ is a screw conveyor.

3. Device according to claim 1, wherein the additional delivery organ is a cellular wheel sluice.

4. Device according to claim 1, wherein the additional delivery organ is a bunker reclaiming wheel.

* * * * *